W. McA. JOHNSON.
PROCESS OF MAKING ALLOY CASTINGS.
APPLICATION FILED MAR. 3, 1914.

1,243,416.

Patented Oct. 16, 1917.

Witnesses:
N. P. Leonard
C. H. Potter

Inventor:
Woolsey McA. Johnson,
by Byrnes, Townsend & Birkenstein,
Attys.

UNITED STATES PATENT OFFICE.

WOOLSEY McA. JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

PROCESS OF MAKING ALLOY CASTINGS.

1,243,416. Specification of Letters Patent. Patented Oct. 16, 1917.

Application filed March 3, 1914. Serial No. 822,115.

*To all whom it may concern:*

Be it known that I, WOOLSEY McA. JOHNSON, a citizen of the United States, residing at Hartford, in the county of Hartford and State of Connecticut, have invented certain new and useful Improvements in Processes of Making Alloy Castings, of which the following is a specification.

This invention relates to processes of making castings of alloys having a volatile metal component, and more particularly castings of brass. A primary object of the invention is the provision of a process which can be economically operated upon any desired scale, whether large or small, and which is moreover capable of operation, if desired, in an intermittent manner, and without substantial or material loss of the volatile metal. According to the invention, copper and zinc may be separately melted in appropriate furnaces, suitably refined, and then run in the proper relative proportions into an electric furnace of the reverberatory resistance type. In this electric furnace the molten metal is stirred, with simultaneous heating to a temperature approximating the volatilizing point of zinc, until it is converted into a homogeneous alloy which can be directly cast into any type of mold. The electric furnace may also be used for the preparation of a homogeneous melt from brass scrap or cuttings, or like alloy-product, the alloy being either melted before its introduction into the electric furnace, or melted in the electric furnace, as may be desired.

For a full understanding of the invention, reference is made to the accompanying drawings illustrating a preferred type of electric furnace for use in carrying out my process. In said drawings—

Figure 1:
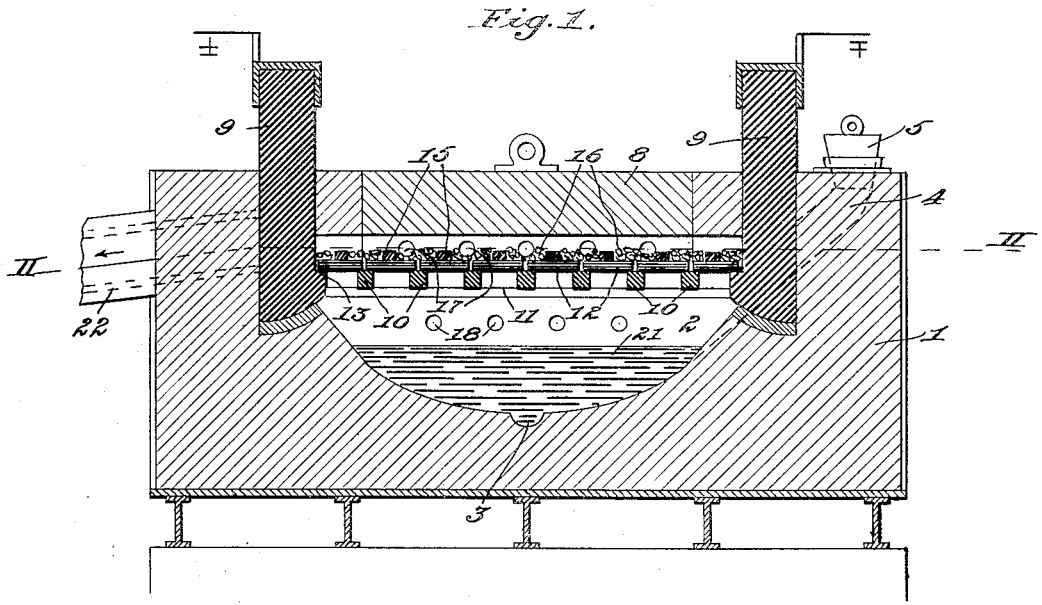
Figure 2:
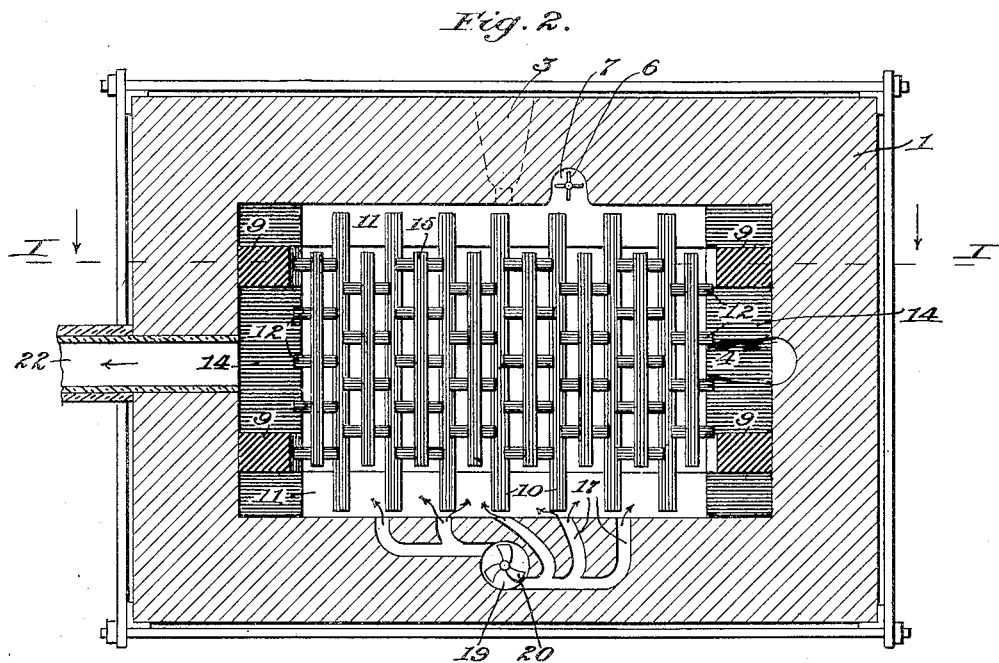

Figure 1 is a vertical longitudinal section of the furnace on line I—I of Fig. 2; and Fig. 2 is a horizontal section of the same on line II—II of Fig. 1.

1 represents the refractory, non-conductive body of the furnace, inclosing a central chamber 2 which constitutes a receptacle for the molten alloy. The chamber 2 is provided with a tap 3 for the molten metal, and with an inlet 4, having a suitable closure 5, and adapted for the introduction either of molten metal or of solid scrap. 6 represents a rotary stirrer, which may be of fireclay or graphite, located in a vertical recess 7 in the side wall of the furnace, and serving to mix the molten metal. 8 is a removable cover, which may be arched, and is of sufficient size to permit free access to the interior of the furnace.

The heating means comprise properly proportioned leading-in electrodes 9, 9, and a resistor-structure arranged to provide a current path between the electrodes and above the surface of the molten metal. As illustrated, this resistor is a removable structure comprising parallel, transverse, spaced carbon or graphite bars 10, the ends of which rest upon longitudinal ledges 11, preferably of recrystallized carborundum or other highly refractory material. The bars 10 support a large number of blocks or bricks 12, likewise of carbon or graphite, these blocks resting in loose contact upon the bars 10, and also extending between the leading-in electrodes and the bars 10 adjacent thereto. In order to receive and support the blocks 12, the leading-in electrodes are cut away to provide supporting shoulders for the blocks, indicated at 13. In the structure illustrated, two leading-in electrodes 9 are shown at each end of the furnace, the space between these being filled to the upper plane of the bars 10 with a conductive material 14, which material is in electrical contact with the leading-in electrodes and serves also to support the blocks 12, and to provide electrical connection thereto. The filling material 14 advantageously consists of "electrode concrete," a conductive composition containing fragments of scrap electrodes bonded by tar or pitch and baked to eliminate volatile matter.

If desired, additional transverse bars of carbon or graphite, indicated at 15, may rest upon the blocks 12; and when the several elements of the resistor-structure are so spaced as to provide a suitable support, the entire grid formed by the bars and blocks 10, 12 and 15 may be covered to any desired depth by a layer or bed 16 of granular coke or the like, as illustrated in Fig. 1. The resistor-structure as above described is readily inserted, removed and repaired and is very effective as a heating means.

The efficiency of the furnace may be increased by making suitable provision for establishing a downward flow of an inert gas, for example carbon monoxid or hydrogen or mixtures thereof, through the resistor and to or toward the surface of the molten metal. The gas acts as a positive conveyer of heat between the resistor and the metal, and supplements very effectively the direct radiation from the resistor. The gas serves also, particularly in case the resistor carries a relatively deep bed of coke, to localize the current path at or near the lower surface of this bed, and therefore in proximity to the molten bath. Means for establishing this gas-flow may comprise gas channels 17 and 18 opening into the furnace chamber, respectively above and below the resistor, and inter-communicating through a well 19 in the furnace wall, a circulating fan 20 of graphite, fireclay or other refractory material being located in this well. The arrangement is such that the gas is discharged into the furnace chamber through the channel 17 above the resistor, flows downwardly therethrough into proximity to or into contact with the pool of metal 21, returning to the well 19 through the lower channels 18. Other appropriate means for accomplishing the same result may of course be used.

When brass castings are to be prepared from the constituent metals, I prefer to proceed as follows: Copper cathodes as deposited in the ordinary electrolytic refining of copper are melted in a reverberatory furnace, and are refined to pitch copper in the usual manner. At the same time, spelter is melted in a desilverizing kettle or otherwise as may be desired, and suitably refined if necessary, under standard conditions, and at a temperature not greatly exceeding its melting-point. The molten copper and zinc, in proper relative proportions to form the alloy are then run into the electric furnace, and are further heated and stirred therein to thorough homogeneity, and then cast from the furnace, either by casting machines or by hand ladles. If desired, the furnace may be arranged to tilt for the purpose of pouring.

The furnace is readily adapted for distilling zinc by providing it with a vapor outlet 22 leading to a suitable condenser.

I claim:—

1. The process of making alloy castings, which consists in separately melting the constituent metals of the alloy, one of said constituents being a volatile metal, transferring them in a molten state and in proper relative proportions into a closed electric furnace, further heating the alloy in said electric furnace and mechanically stirring the same during such further heating, and casting the alloy.

2. The process of making alloy castings, which consists in separately melting and refining the constituent metals of the alloy, one of said constituents being a volatile metal, transferring the refined metals in the molten state and in proper relative proportions into a closed electric furnace, further heating the alloy in said electric furnace and mechanically stirring the same during such further heating, and casting the alloy.

3. The process of making alloy castings, which consists in separately melting the constituent metals of the alloy, one of said constituents being a volatile metal, transferring them in the molten state and in proper relative proportions into a closed electric furnace, further heating the alloy in said electric furnace by radiation and mechanically stirring the same during such further heating until a homogeneous alloy is obtained, and casting the alloy.

4. The process of making alloy castings, which consists in separately melting and refining the constituent metals of the alloy, one of said constituents being a volatile metal, transferring the refined metals in the molten state and in proper relative proportions into a closed electric furnace, further heating the alloy in said electric furnace by radiation and mechanically stirring the same during such further heating until a homogeneous alloy is obtained, and casting the alloy.

5. The process of making brass castings, which consists in melting copper cathodes and subjecting them to a refining operation, melting spelter and refining the same if required, transferring the copper and zinc in the molten state and in proper relative proportions for the production of brass into a closed electric furnace, further heating the molten mass in said electric furnace and mechanically stirring the same during such further heating until a homogeneous product is obtained, and casting the alloy.

In testimony whereof I affix my signature in presence of two witnesses.

WOOLSEY McA. JOHNSON.

Witnesses:
N. P. LEONARD,
C. P. TOWNSEND.